Figure 1:
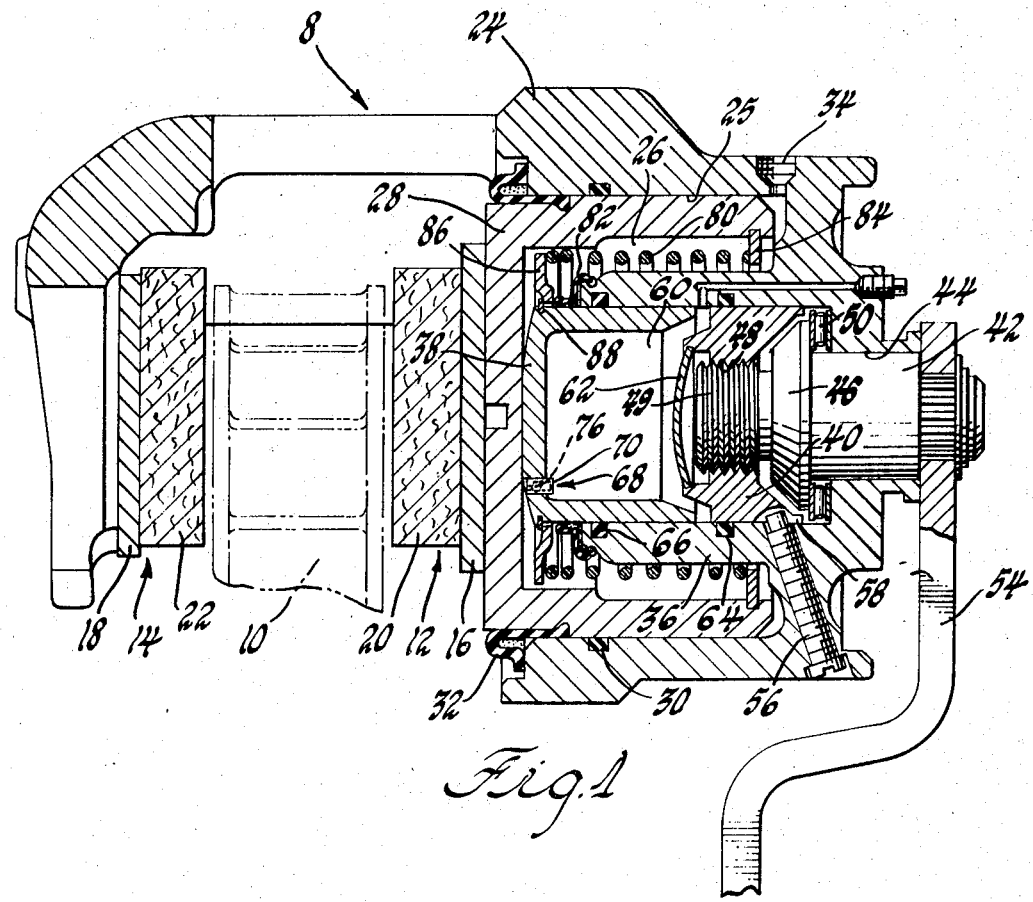

United States Patent
Hay

[15] 3,643,763
[45] Feb. 22, 1972

[54] COMBINATION HYDRAULICALLY AND MECHANICALLY ACTUABLE DISC BRAKE WITH HYDRAULIC WEAR ADJUSTMENT

[72] Inventor: Charles N. Hay, Sandusky, Ohio
[73] Assignee: General Motors Corporaiton, Detroit, Mich.
[22] Filed: Sept. 16, 1970
[21] Appl. No.: 72,641

[52] U.S. Cl. .................. 188/71.8, 188/106 F, 188/196 A
[51] Int. Cl. ............................................. F16d 55/20
[58] Field of Search .................. 188/71.7, 71.8, 72.6, 196 A, 188/106 F; 60/54.5 S

[56] References Cited

UNITED STATES PATENTS 2,972,865  2/1961  Orshansky .................. 188/196 A X
3,125,187  3/1964  Dotto .......................... 188/196 A X Primary Examiner—Duane A. Reger
Attorney—W. E. Finken and D. D. McGraw

[57] ABSTRACT

A disc-brake caliper assembly having a hydraulically actuable primary piston is provided with an extendible member including a fluid link between second and third pistons. The extendible member acts as a rigid link through which the brake is mechanically actuated and is extendible at the urging of a spring by addition of fluid to the fluid link to adjust for lining wear.

6 Claims, 2 Drawing Figures

PATENTED FEB 22 1972　　　　3,643,763

INVENTOR.
Charles N. Hay
BY
D. D. McGraw
ATTORNEY

COMBINATION HYDRAULICALLY AND MECHANICALLY ACTUABLE DISC BRAKE WITH HYDRAULIC WEAR ADJUSTMENT

The invention relates to a disc-brake caliper assembly and more particularly to a disc-brake caliper assembly having mechanical and hydraulic actuating means and a hydraulic wear adjustment mechanism.

It is desirable in an automotive disc-brake assembly to provide hydraulic actuation for service braking and mechanical actuation for emergency and parking braking. It is also desirable to provide an automatic wear adjustment mechanism to maintain the brakeshoes in close relationship to the disc by preventing excessive knockback of the piston into the caliper when the hydraulic pressure is released so that little movement of the shoes is required to actuate the brake.

The invention consists of a modification to a caliper assembly in which a hydraulically actuable primary piston carries a brake pad assembly into braking engagement with one side of the disc and the reaction forces are transferred through the brake caliper to move the opposing brake pad assembly into braking engagement with the other side of the disc. The modification includes the addition of a second bore inside the primary expansible chamber formed by the primary piston. A second piston is located within this second bore and is slidable therein to operatively engage the primary piston for mechanical actuation thereof. The mechanical actuating mechanism includes a member which is rotatably received through the wall of the caliper housing and to which is attached an operating lever. A third piston is located within the second piston bore and threadedly engages a portion of the rotatable member so that rotary movement of the member imparts axial movement to the third piston. Hydraulic fluid located in the secondary expansible chamber between the second and third pistons acts as a fluid link therebetween to advance the second piston, the abutting first piston, and the shoe assembly upon rotation of the rotatable member. Following release of the hydraulic brake-actuating pressure and consequent retraction of the first piston, the second piston advances at the urging of a spring to engage the first piston and hold it in closer relationship with the disc to adjust for lining wear resulting from the hydraulic actuation. A one-way valve mounted in the wall of the second piston provides one-way flow of hydraulic fluid from the primary expansible chamber to the secondary expansible chamber as the secondary expansible chamber between the second and third pistons increases in volume due to the wear-adjusting movement of the second piston. A flexible collar seated on the second piston housing is compressed against the second piston by the hydraulic actuating pressure and prevents the second piston from advancing during hydraulic brake actuation.

Figure 2:
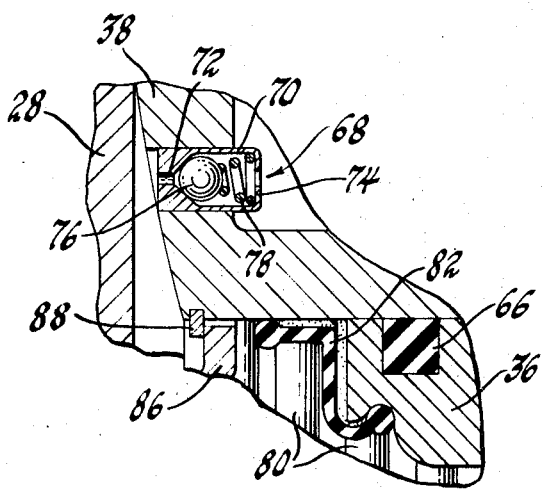

In the drawings:

FIG. 1 is a cross-sectional view of the disc-brake assembly having parts broken away and in section; and FIG. 2 is an enlarged fragmentary view of FIG. 1 showing the collar and the one-way valve assembly.

Referring to FIG. 1, the disc-brake assembly includes a caliper assembly 8 which is suitably mounted on a nonrotatable member and a disc 10 which is attached to a vehicle wheel assembly. The inner and outer brakeshoe assemblies 12 and 14 include backing plates 16 and 18 to which are secured suitable brake linings 20 and 22. These shoe assemblies are respectively positioned in the caliper assembly on opposite sides of the disc 10. The caliper housing 24 has formed therein an axially extending bore 25 in which the primary piston 28 is slidable to form the primary expansible chamber 26. The primary piston 28 engages the brakeshoe assembly 12 so that when chamber 26 is pressurized that shoe assembly moves into braking engagement with the disc 10 and the reaction force transferred to the caliper housing 24 moves the brakeshoe assembly 14 into braking engagement with the other side of the disc 10. Pressure seal 30 and dust seal 32 are provided between the primary piston 28 and the caliper housing 24. Fluid inlet 34 is connected with a master cylinder assembly by suitable conduit means.

An auxiliary brake-actuating means is provided. An axially extending wall 36 located radially inward of the primary piston bore 25 forms a cavity in the caliper housing 24 in which the second piston 38 is slidable. A third piston 40 is also slidably engaged in the cavity formed by wall 36 and has a threaded bore 48 extending therethrough. Member 42 extends through the bore 44 in the caliper housing 24 and includes a shoulder portion 46 and a threaded portion 49. Threaded portion 49 engages the mating threaded bore 48 of third piston 40 so that rotary movement of member 42 imparts axial movement to third piston 40. Shoulder portion 46 and thrust bearing 50 cooperate to permit rotary movement of member 42 and to prevent axial movement thereof. Lever 54 is attached to the outer end of member 42 and is connected to the emergency and parking brake control mechanism by a cable or other means not shown. Screw 56 is threaded through caliper housing 24 and engages a slot 58 in the third piston 40 to prevent the third piston 40 from rotating with member 42 but allowing reciprocal axial movement of the third piston 40. Hydraulic fluid located in the secondary expansible chamber 60 which is formed between the second piston 38 and third piston 40 provides a fluid link between the third piston 40 and the second piston 38 so that axial movement of third piston 40 causes axial movement of second piston 38. Plug 62 and seal 64 prevent fluid leakage around third piston 40. Seal 66 prevents fluid leakage around second piston 38.

Adjuster spring 80, collar 82, and one-way valve 68 cooperate to advance the second piston 38 toward disc 10 as required to adjust for lining wear resulting from the previous brake actuation and to hold second piston 38 at its adjusted position. One-way valve 68, best shown in FIG. 2, includes a ball 76, a spring 78, and a housing 70 which provides an orifice 72 and a spring seat 74. Spring 78 is seated against the spring seat 74 and urges ball 76 against housing 70 into closure of orifice 72. Spring seat 84 engages primary piston 28. Ring 88 engages second piston 38 to locate spring seat 86. Adjuster spring 80 is seated at spring seats 84 and 86 and acts to urge second piston 38 into engagement with primary piston 28. Collar 82 is an annular flexible member which is seated on wall 36 of the caliper housing and extends to engage the wall of the second piston 38.

When lever 54 is rotated, the third piston 40 moves axially into the secondary expansible chamber 60 displacing the hydraulic fluid located therein and imparting axial movement to second piston 38 and the abutting primary piston 28 and consequently carrying brakeshoe assembly 12 into engagement of disc 10. The fluid pressure generated in the secondary expansible chamber 60 by the axial movement of third piston 40 acts against ball 76 of the one-way valve 68 to insure closure of the one-way valve 68 and maintenance of the fluid link between the third piston 40 and second piston 38. The primary piston 28, second piston 38, and third piston 40 retract to their original position in caliper housing 24 when the actuating force applied to lever 54 is relaxed. A loss of brake fluid in primary expansible chamber 26 does not compromise emergency and parking braking since one-way valve 68 holds the fluid in secondary expansible chamber 60.

When the brakes are hydraulically applied, pressurized fluid enters primary expansible chamber 26 through inlet port 34 and displaces primary piston 28 out of caliper housing 24. The fluid pressure within the primary expansible chamber 26 acts upon collar 82 compressing it against the second piston 38 to resist the urging of spring 80 and thereby prevent the second piston 38 from advancing into the primary expansible chamber 26. Upon brake release, pressure is drained from the primary expansible chamber 26 and the primary piston 28 retracts into caliper housing 24. As the pressure is removed, collar 82 releases its grip on second piston 38 so that the second piston 38 can advance at the urging of spring 80 to meet the primary piston 28 at a position closer to the disc 10 as required to adjust for the brake-lining wear resulting from the brake actuation. As piston 38 advances, a differential pressure is produced between the primary expansible chamber 26 and the secondary expansible chamber 60. This differential pressure overcomes the resistance of spring 78 to lift ball 76 from valve housing 70 and allow fluid flow from the primary expansible chamber 26 to the secondary expansible chamber 60. If lining wear has not occurred during actuation, the retraction of primary piston 26 into the caliper housing 24 when the hydraulic pressure is relieved is limited by engagement with the second piston 38 to hold the primary piston 26 at the last adjusted position to maintain the minimum clearance between disc 10 and the brakeshoe assemblies. It is essential to the operation of the adjuster that the force required to move primary piston 28 axially be greater than that required to move second piston 38 so that spring 80 will advance the second piston 38 rather than retract primary piston 28. It is noted that since operation of the wear adjuster is independent of movement of third piston 40 and in fact depends upon the third piston 40 and member 42 being stationary, the present invention also discloses an improved adjuster for a conventional disc-brake caliper which may be utilized without providing a mechanical actuating means.

The parking brake can be applied during hydraulic actuation. The portion on the flexible collar which grips second piston 38 moves with the second piston as it advances into engagement with the primary piston.

Thus, a disc-brake assembly having hydraulic service actuating means and mechanically auxiliary actuating means and a hydraulic wear-adjustment mechanism is provided.

What is claimed is:

1. Self-adjusting means for a disc-brake assembly having a disc and a brake pad assembly and comprising:
   a housing having first and second axially extending chambers therein;
   a first piston sealingly slidable in said first chamber and engaging said brake pad assembly, said first piston advanceable to carry said brake pad assembly into engagement of said disc to provide braking torque and retractable to release said braking torque;
   a second piston sealingly slidable in said second chamber and engageable with said first piston to limit said retractable movement thereof, said second piston advanceable to engage said first piston in closer relationship to said disc to adjust for wear of said brake pad assembly;
   a first expansible chamber formed by said housing, said first piston and said second piston;
   means communicating pressurized hydraulic brake fluid to said first expansible chamber to provide service actuation;
   a second expansible chamber formed by said housing, and said second piston, said second expansible chamber having hydraulic brake fluid therein;
   means continuously urging axial movement of said second piston toward said first piston;
   means preventing axial movement of said second piston during said service actuation;
   and one-way valve means communicating fluid from said first expansible chamber to said second expansible chamber consequent to axial movement of said second piston toward said first piston, said one-way valve means preventing fluid flow from said second expansible chamber and thereby maintaining the adjusted position of said second piston.

2. The brake assembly of claim 1 further characterized by said means preventing movement of said second piston being an annular flexible collar seated on said housing in said first expansible chamber and engaging said second piston, said flexible collar being compressed against said second piston upon said service actuation to resist said means urging axial movement of said second piston and thereby prevent movement of said second piston.

3. A combination service actuating means, auxiliary actuating means and self-adjusting means for a disc-brake assembly having a disc and a brake pad assembly and comprising:
   a housing having first and second axially extending chambers therein;
   a first piston sealingly slidable in said first chamber and engaging said brake pad assembly, said first piston advanceable to carry said brake pad assembly into engagement of said disc to provide braking torque and retractable to release said braking torque;
   a second piston sealingly slidable in said second chamber and engageable with said first piston to limit said retractable movement thereof, said second piston advanceable to engage said first piston in closer relationship to said disc to adjust for wear of said brake pad assembly;
   means associated with said housing and axially movable in said housing upon rotary movement of said associated means relative to said housing;
   a first expansible chamber formed by said housing, said first piston and said second piston;
   means communicating pressurized hydraulic brake fluid to said first expansible chamber to provide said service actuation;
   a second expansible chamber formed by said housing, said second piston and said means associated with said housing, said second expansible chamber having hydraulic brake fluid therein and forming a fluid link between said second piston and said means associated with said housing so that axial movement of said associated means causes axial movement of said second piston and said abutting first piston thereby carrying said brake pad assembly into engagement of said disc to provide said auxiliary actuation;
   means continuously urging axial movement of said second piston toward said first piston;
   means preventing axial movement of said second piston during said service actuation;
   and one-way valve means communicating fluid from said first expansible chamber to said second expansible chamber consequent to axial movement of said second piston toward said first piston, said one-way valve means preventing fluid flow from said second expansible chamber to said first expansible chamber and thereby maintaining the adjusted position of said second piston.

4. The brake assembly of claim 3 further characterized by said means urging axial movement of said second piston including, first spring seat means engaging said first piston, second spring seat means engaging said second piston, and spring means engaging said first and second spring seat means and urging said second piston into engagement with said first piston.

5. The brake assembly of claim 3 further characterized by said means preventing movement of said second piston being an annular flexible collar seated on said housing in said first expansible chamber and engaging said second piston, said flexible collar being compressed against said second piston upon said service actuation to resist said means urging axial movement of said second piston and thereby prevent movement of said second piston.

6. A combination service actuating means, auxiliary actuating means and self-adjusting means for a disc-brake assembly having a disc, and a brake pad assembly comprising:
   a housing having first and second axially extending chambers therein;
   a first piston sealingly slidable in said first chamber and engaging said brake pad assembly, said first piston advanceable to carry said brake pad assembly into engagement of said disc to provide braking torque and retractable to release said braking torque;
   a second piston sealingly slidable in said second chamber and engageable with said first piston to limit said retractable movement thereof, said second piston advanceable to engage said first piston in closer relationship to said disc to adjust for wear of said brake pad assembly;
   means associated with said housing and axially movable in said housing upon rotatable movement of said associated means relative to said housing, said associated means including:

a member having a threaded portion, a rod portion and a shoulder portion, said rod portion being rotatably received through said housing and said shoulder portion engaging said housing to prevent axial movement of said member, a third piston sealingly slidable in said second axially extending chamber and having a threaded portion engaging said threaded portion of said member, said third piston being axially movable upon rotation of said member, means preventing rotary movement of said third piston, and means for rotating said screw member:

a first expansible chamber formed by said housing, said first piston and said second piston;

means communicating pressurized hydraulic brake fluid to said first expansible chamber to provide said service actuation;

a second expansible chamber formed by said housing, said second piston, and said third piston, said second expansible chamber having hydraulic brake fluid therein forming a fluid link between said second piston and said third piston so that axial movement of said third piston causes axial movement of said second piston and said abutting first piston to provide said auxiliary actuation;

means continuously urging axial movement of said second piston including:
  a first spring seat means engaging said first piston,
  a second spring seat means engaging said second piston,
  and spring means engaging said first and second spring seat means and urging said second piston toward engagement with said first piston;

means preventing axial movement of said second piston during said service actuation including an annular flexible collar seated on said housing in said first expansible chamber and engaging said second piston, said flexible member being compressed against said second piston upon said service actuation to prevent axial movement of said second piston;

and one-way valve means communicating fluid from said first expansible chamber to said second expansible chamber consequent to axial movement of said second piston toward said first piston, said one-way valve means preventing fluid flow from said second expansible chamber to said first expansible chamber and thereby maintaining the adjusted position of said second piston.

* * * * *